US 7,058,565 B2

(12) United States Patent
Gusler et al.

(10) Patent No.: US 7,058,565 B2
(45) Date of Patent: Jun. 6, 2006

(54) EMPLOYING SPEECH RECOGNITION AND KEY WORDS TO IMPROVE CUSTOMER SERVICE

(75) Inventors: Carl Phillip Gusler, Austin, TX (US); Rick Allen Hamilton, II, Charlottesville, VA (US); Timothy Moffett Waters, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/015,246

(22) Filed: Dec. 17, 2001

(65) Prior Publication Data

US 2003/0115056 A1 Jun. 19, 2003

(51) Int. Cl.
*G06F 17/08* (2006.01)
(52) U.S. Cl. .......................... 704/7; 704/275; 704/270; 379/88.01; 455/411; 455/415
(58) Field of Classification Search ................ 704/275, 704/270; 379/88.01; 455/411
See application file for complete search history.

(56) References Cited

U.S. PATENT DOCUMENTS

| | | | |
|---|---|---|---|
| 5,724,416 A | | 3/1998 | Foladare et al. |
| 5,797,116 A | | 8/1998 | Yamada et al. |
| 5,832,063 A | | 11/1998 | Vysotsky et al. |
| 6,046,762 A | * | 4/2000 | Sonesh et al. ............ 348/14.11 |
| 6,055,497 A | | 4/2000 | Hallkvist et al. |
| 6,100,882 A | | 8/2000 | Sharman et al. |
| 6,122,615 A | | 9/2000 | Yamamoto et al. |
| 6,141,661 A | | 10/2000 | Brown et al. |
| 6,178,404 B1 | * | 1/2001 | Hambleton et al. ......... 704/275 |
| 6,205,428 B1 | | 3/2001 | Brown et al. |
| 6,223,158 B1 | | 4/2001 | Goldberg |
| 6,243,454 B1 | | 6/2001 | Eslambolchi |
| 6,370,504 B1 | | 4/2002 | Zick et al. |
| 6,404,872 B1 | | 6/2002 | Goldberg et al. |
| 6,462,500 B1 | | 10/2002 | L'Hegarat et al. |
| 6,487,530 B1 | | 11/2002 | Lin et al. |
| 6,532,444 B1 | | 3/2003 | Weber |
| 6,640,210 B1 | * | 10/2003 | Schaefer et al. ............. 704/235 |
| 6,801,619 B1 | * | 10/2004 | Bae ....................... 379/266.01 |

OTHER PUBLICATIONS

Phillips, "VoiceXML and the Voice / Web Environment Visual Programming Tools for Telephone Application Development," *Dr. Dobb's Journal*, vol. 26, Issue 10, pp. 91-96, Oct. 2001.

Nuance Communications, *The Business Case for Speech Recognition*, 2000 (White paper available at www.nuance.com). Do Date or Month.

* cited by examiner

*Primary Examiner*—Susan McFadden
*Assistant Examiner*—Minerva Rivero
(74) *Attorney, Agent, or Firm*—Stephen J. Walder, Jr.; David A. Mims, Jr.

(57) ABSTRACT

The invention comprises capturing a customer's speech, recognizing a key word in the customer's speech, searching a database, and retrieving information from the database. The retrieving is a real-time process, completed during a conversation involving the customer and a customer service representative. Examples include methods employing computerized speech recognition and key words to improve customer service, systems for executing methods of the present invention, and instructions on a computer-usable medium, or resident in a computer system, for executing methods of the present invention.

23 Claims, 6 Drawing Sheets

EMPLOYING SPEECH RECOGNITION AND KEY WORDS TO IMPROVE CUSTOMER SERVICE

CROSS-REFERENCES TO RELATED APPLICATIONS

The present application is related to a co-pending application entitled Employing Speech Recognition and Capturing Customer Speech to Improve Customer Service, filed on even date herewith, assigned to the assignee of the present application, and herein incorporated by reference.

FIELD OF THE INVENTION

The present invention relates generally to information handling, and more particularly to methods and systems employing computerized speech recognition and key words to improve customer service.

BACKGROUND OF THE INVENTION

Many approaches to speech transmission and speech recognition have been proposed in the past, including the following examples: U.S. Pat. No. 6,100,882 (Sharman, et al., Aug. 8, 2000), "Textual Recording of Contributions to Audio Conference Using Speech Recognition," relates to producing a set of minutes for a teleconference. U.S. Pat. No. 6,243,454 (Eslambolchi, Jun. 5, 2001), "Network-Based Caller Speech Muting," relates to a method for muting a caller's outgoing speech to defeat transmission of ambient noise, as with a caller in an airport. U.S. Pat. No. 5,832,063 (Vysotsky et al., Nov. 3, 1998), relates to speaker-independent recognition of commands, in parallel with speaker-dependent recognition of names, words or phrases, for speech-activated telephone service. However, the above-mentioned examples address substantially different problems (i.e. problems of telecommunications service), and thus are significantly different from the present invention.

There are methods and systems in use today that utilize automatic speech recognition to replace human customer service representatives. Automatic speech recognition systems are capable of performing some tasks; however, a customer may need or prefer to actually speak with another person in many cases. Thus there is a need for systems and methods that use both automatic speech recognition, and human customer service representatives, automatically utilizing key words in customer speech to improve the customer service rendered by humans.

SUMMARY OF THE INVENTION

The present invention comprises capturing a customer's speech, recognizing a key word in the customer's speech, searching a database, and retrieving information from the database. The retrieving is a real-time process, completed during a conversation involving the customer and a customer service representative.

Consider some examples. It would be useful to identify key words spoken by a customer, through speech recognition technology. There would be no need to prolong a transaction by having a customer service representative manually input key words, or manually direct a search. Consider using a key word to automatically search a database and retrieve information from the database. The retrieved information could be automatically provided to a customer service representative. Another example would be automatically initiating action, based on said key word, to solve a problem affecting said customer. This may involve preparing an e-mail message, preparing an order form, preparing an address label, routing a telephone call, or other similar tasks. These examples could apply to any business or organization providing goods or services.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

Figure 1:
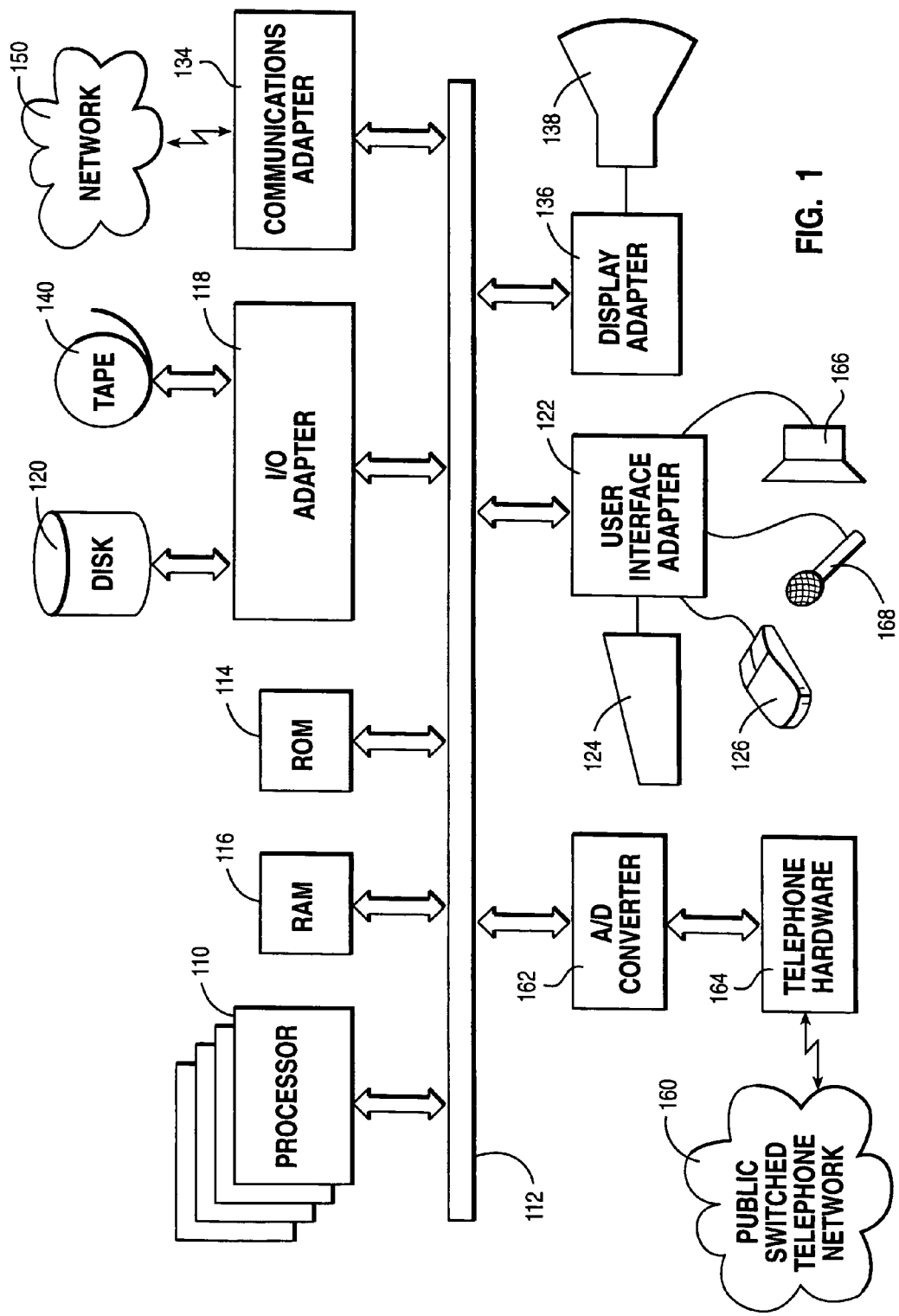
FIG. 1 illustrates a simplified example of a computer system capable of performing the present invention.

The examples that follow involve the use of one or more computers and may involve the use of one or more communications networks. The present invention is not limited as to the type of computer on which it runs, and not limited as to the type of network used.

As background information for the present invention, reference is made to the book by M. R. Schroeder, *Computer Speech: Recognition, Compression, Synthesis,* 1999, Springer-Verlag, Berlin, Germany. This book provides an overview of speech technology, including automatic speech recognition and speaker identification. This book provides introductions to two common types of speech recognition technology: statistical hidden Markov modeling, and neural networks. Reference is made to the book edited by Keith Ponting, *Computational Models of Speech Pattern Processing,* 1999, Springer-Verlag, Berlin, Germany. This book contains two articles that are especially useful as background information for the present invention. First, the article by Steve Young, "Acoustic Modeling for Large Vocabulary Continuous Speech Recognition," at pages 18–39, provides a description of benchmark tests for technologies that perform speaker-independent recognition of continuous speech. (At the time of that publication, the state-of-the-art performance on "clean speech dictation within a limited domain such as business news" was around 7% word error [WER].) Secondly, the article by Jean-Paul Haton, "Connectionist and Hybrid Models for Automatic Speech Recognition," pages 54–66, provides a survey of research on hidden Markov modeling and neural networks.

The following are some examples of speech recognition technology that would be suitable for implementing the present invention. Large-vocabulary technology is available from IBM in the VIAVOICE and WEBSPHERE product families. SPHINX speech-recognition technology is freely available via the World Wide Web as open source software, from the Computer Science Division of Carnegie Mellon University, Pittsburgh, Pa. SPHINX 2 is described as real-time, large-vocabulary, and speaker-independent. SPHINX 3 is slower but more accurate, and may be suitable for transcription for example. Other technology similar to the above-mentioned examples also may be used.

Another technology that may be suitable for implementing the present invention is extensible markup language (XML), and in particular, VoiceXML. XML provides a way of containing and managing information that is designed to handle data exchange among various data systems. Thus it is well-suited to implementation of the present invention. Reference is made to the book by Elliotte Rusty Harold and W. Scott Means, *XML in a Nutshell* (O'Reilly & Associates, 2001). As a general rule XML messages use "attributes" to contain information about data, and "elements" to contain the actual data. As background information for the present invention, reference is made to the article by Lee Anne Phillips, "VoiceXML and the Voice/Web Environment: Visual Programming Tools for Telephone Application Development," *Dr. Dobb's Journal*, Vol. 26, Issue 10, pages 91–96, October 2001. One example described in the article is a currency-conversion application. It receives input, via speech and telephone, of an amount of money. It responds with an equivalent in another currency either via speech or via data display.

The following are definitions of terms used in the description of the present invention and in the claims:

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Customer" means any buyer, client, consumer, patient, patron, or user.

"Customer service" means interaction with a customer of any business, organization, or profession.

"Customer service representative" or "service representative" means any professional or other person who interacts with a customer, including an agent, assistant, broker, banker, consultant, engineer, legal professional, medical professional, or sales person.

"Key word" or "keyword" means any name, number, phrase, term, word or other characters that may be used in searching for information in a database.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

FIG. 1 illustrates a simplified example of an information handling system that may be used to practice the present invention. The invention may be implemented on a variety of hardware platforms, including personal computers, workstations, servers, and embedded systems. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has analog/digital converter 162 for connecting the system to telephone hardware 164 and public switched telephone network 160. The system has user interface adapter 122 for connecting keyboard 124, mouse 126, or other user interface devices such as audio output device 166 and audio input device 168 to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
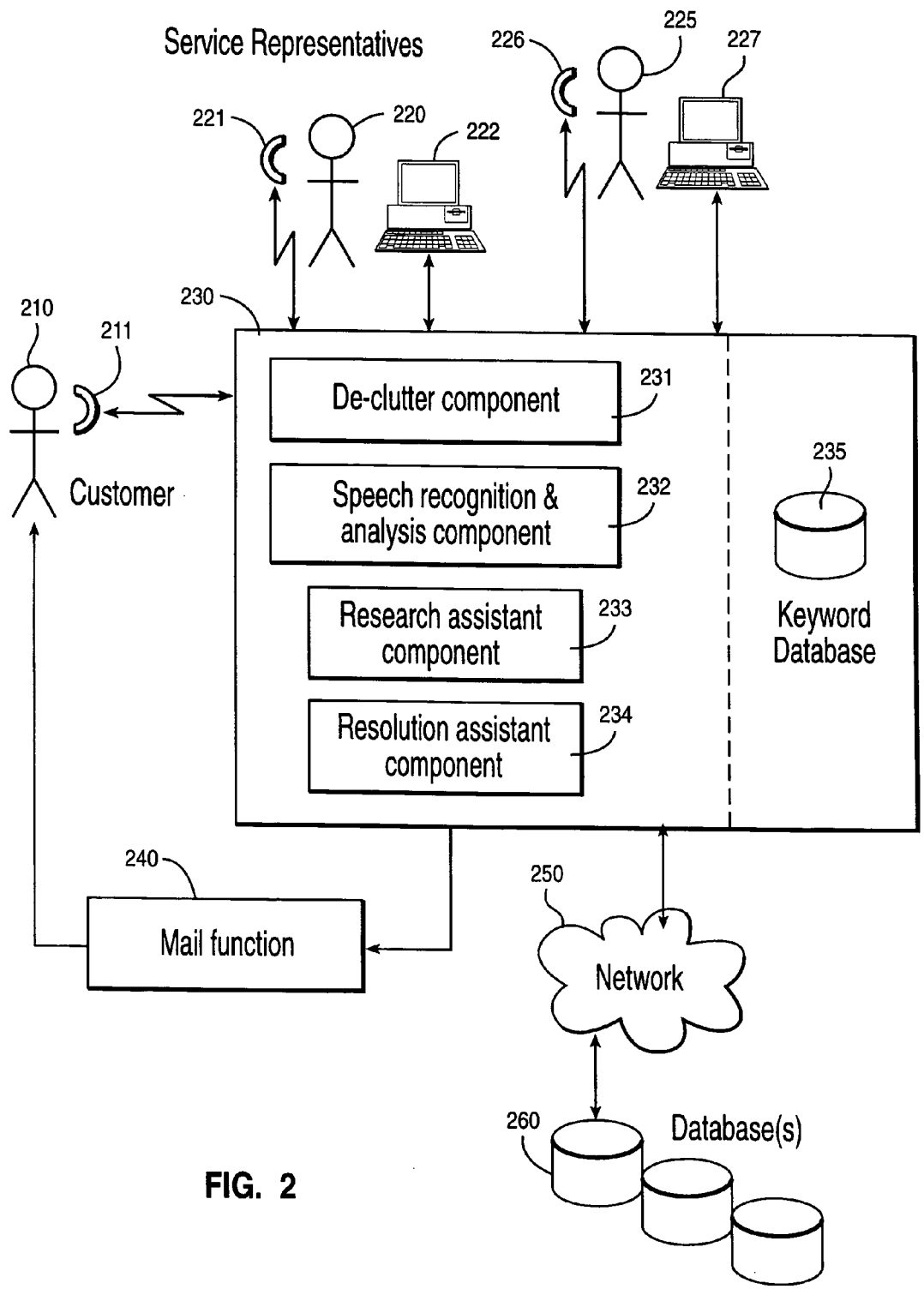
FIG. 2 is a high-level block diagram illustrating an example of a system employing computerized speech recognition and key words, according to the teachings of the present invention.

FIG. 2 is a high-level block diagram illustrating an example of a system, 230, employing computerized speech recognition and capturing customer speech. System 230 is shown receiving speech input from two or more parties to a telephone conversation, including a first speaker (such as customer service representative 220 for example). System 230 blocks a portion of the speech input that originates from the first speaker (service representative 220) and performs speech recognition on the remaining portion of the speech input. The blocking and performing speech recognition are real-time processes, completed during a conversation. System 230 includes various components. De-clutter component 231 de-clutters the speech input from service representatives 220 and 225 and customer 210 for better automatic processing, by removing all but the pertinent words spoken by the customer. This will be explained in more detail below.

After capturing customer 210's speech, system 230 recognizes a key word in customer 210's speech. Based on said key word, system 230 searches a database 260, and retrieves information from database 260. System 230 includes a speech recognition and analysis component 232, that may be implemented with well-known speech recognition technologies.

System 230 includes a key word database or catalog 235 that comprises a list of searchable terms. An example is a list of terms in a software help index. As indicated by the dashed line, key word database 235 may be incorporated into system 230, or may be independent of, but accessible to, system 230. Key word database 235 may be implemented with database management software such as ORACLE, SYBASE, or IBM's DB2, for example. An organization may create key word database 235 by pulling information from existing databases containing customer data and product data, for example. A customer name is an example of a key word. A text extender function, such as that available with IBM's DB2, would allow a spoken name such as "Petersen" to be retrieved through searches of diverse spellings like "Peterson" or "Pedersen." Other technology similar to the above-mentioned examples also may be used.

System 230 may also include research assistant component 233, that would automate data-retrieval functions involved when service representatives 220 and 225 assist customer 210. Data may be retrieved from one or more databases 260, either directly or via network 250. Resolution assistant component 234 would automate actions to resolve problems for customer 210. Resolution assistant component 234 may employ mail function 240, representing an e-mail application, or conventional, physical mail or delivery services. Thus information, goods, or services could be supplied to customer 210.

In this example, service representatives 220 and 225 are shown interacting with customer 210 via telephone, represented by telephone hardware 211, 221, and 226. A similar system could be used for face-to-face interactions. Service representatives 220 and 225 are shown interacting with system 230 via computers 222 and 227. This represents a way to display information that is retrieved from database 260, to service representatives 220 and 225. Service representatives 220 and 225 may be located at the same place, or at different places.

Figure 3:
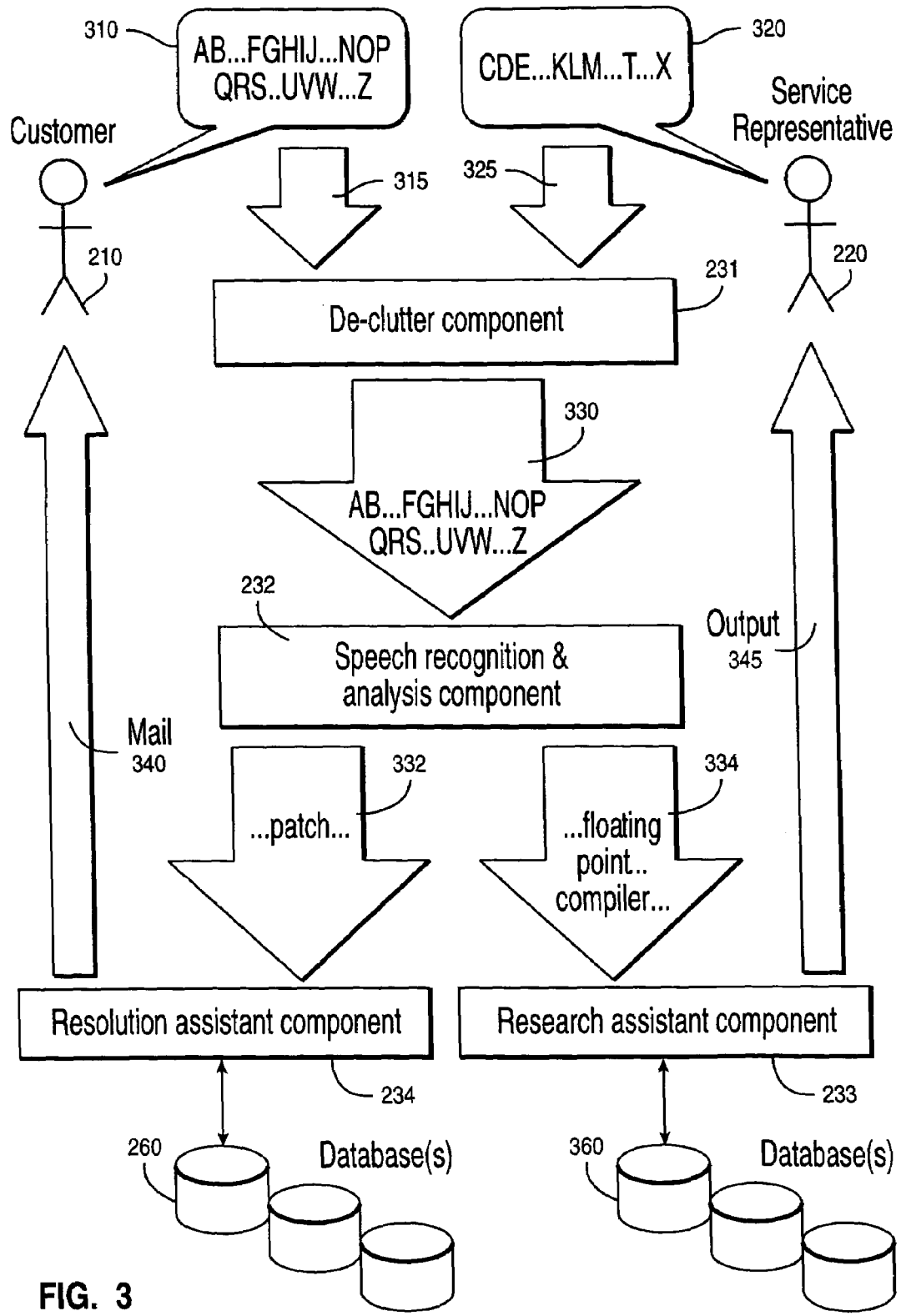
FIG. 3 illustrates selected operations of another exemplary system, employing computerized speech recognition and key words.

FIG. 3 illustrates selected operations of another exemplary system, employing computerized speech recognition and capturing customer speech. Customer speech is symbolized by the letters in bubble 310. A service representative's speech is symbolized by the letters in bubble 320. De-clutter component 231 is shown receiving speech input (arrows 315 and 325) from two speakers, including a first speaker (service representative 220); blocking a portion of the speech input that originates from the first speaker (service representative 220); and processing the remaining portion of the speech input with a computer (speech recognition and analysis component 232). The blocking and processing are real-time processes, completed during a conversation. Speech recognition and analysis component 232 is shown receiving speech input (arrow 330) from a customer 210. Speech recognition and analysis component 232 performs speech recognition on the speech input to generate a text equivalent, and parses the text to identify key words (arrows 332 and 334).

The key words at arrows 332 and 334 ("patch," "floating point," and "compiler") are examples that may arise in the computer industry. Also consider an example from the financial services industry. A customer may ask for help regarding an Individual Retirement Account. A service representative may ask: "Did you say that you wanted help with a Roth IRA?" The customer may respond: "No, I need help with a standard rollover IRA." The present invention would block that portion of the speech input that originates from the service representative, and process the remaining portion of the speech input that contains "rollover" and "IRA" as examples of key words.

Research assistant component 233 is shown searching for an occurrence of key words 334 in a database 360, retrieving information from database 360, and providing retrieved information (arrow 345) to service representative 220. The retrieving is completed during a conversation involving customer 210 and service representative 220. Thus research assistant component 233 would automate data-retrieval functions involved when service representative 220 assists customer 210. Research assistant component 233 may be implemented with well-known search engine technologies. Databases shown at 360 may contain customer information, product information or problem management information, for example.

Resolution assistant component 234 is shown searching for an occurrence of a key word 332 in a database 260, retrieving information from database 260, and sending mail (arrow 340) to customer 210. Thus resolution assistant component 234 initiates action, based on a key word 332, to solve a problem affecting customer 210. Resolution assistant component 234 may initiate one or more tasks such as sending a message by e-mail, preparing an order form, preparing an address label, or routing a telephone call. Resolution assistant component 234 may be implemented with well-known search engine and e-mail technologies, for example. Databases shown at 260 may contain customer names and addresses, telephone call—routing information, problem management information, product update information, order forms, or advisory bulletins for example.

Figure 4:
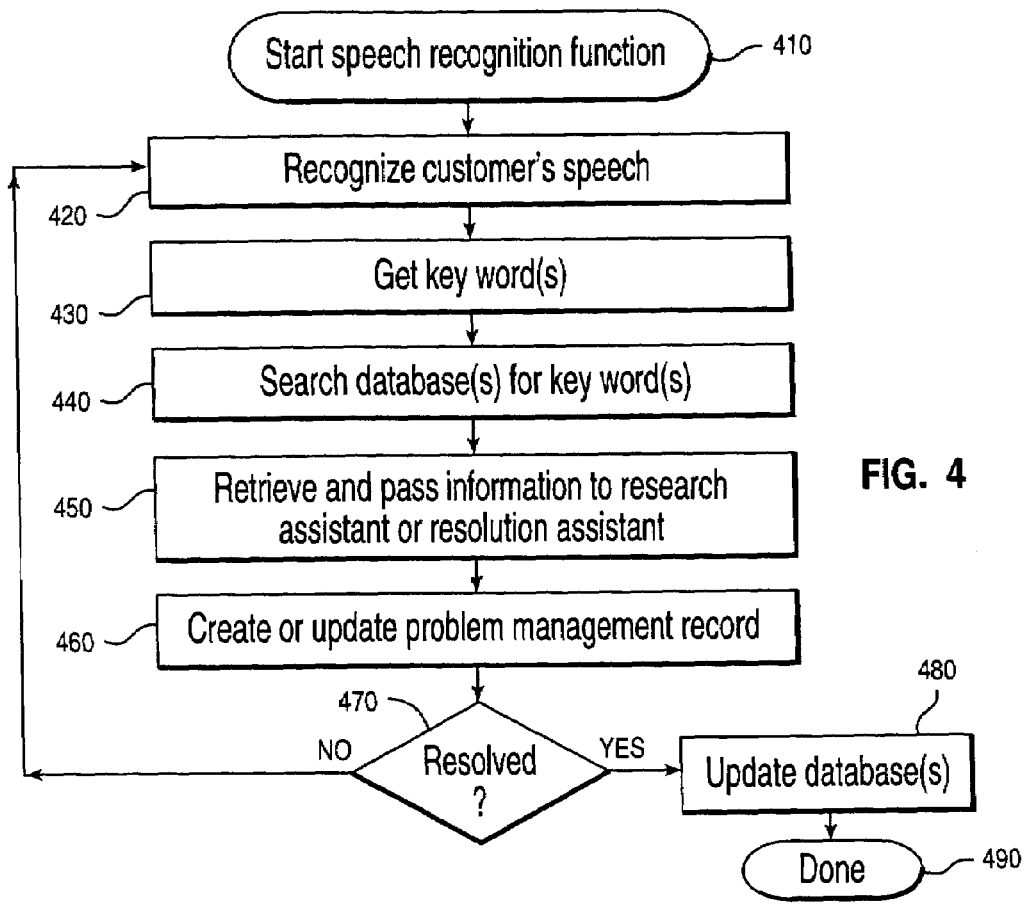
FIG. 4 is a flow chart illustrating an example of a speech recognition and analysis function, according to the teachings of the present invention.

FIG. 4 is a flow chart illustrating an example of a speech recognition and analysis function, according to the teachings of the present invention. The function begins at block 410, receiving speech input from a customer. At block 420 the function performs speech recognition on said speech input to generate a text equivalent. At block 430 the function parses said text to identify at least one key word. At block 440 the function searches for an occurrence of said key word in at least one database. At block 450 the function retrieves information from at least one database, and passes the information to a research assistant function or a resolution assistant function. The retrieving is completed during a conversation involving the customer and a customer service representative. In another example, search and retrieval could be performed by a research assistant function or a resolution assistant function. At block 460 the function creates or updates a problem management record (PMR) to document research or actions to solve a problem affecting the customer.

If the problem is not resolved at this point, the "No" branch is taken at decision 470, and the function returns to block 420. For example, this may represent continued conversation involving the customer and a customer service representative, and continued speech input. On the other hand, this may represent a decision to transfer handling to another customer service representative, who would continue the conversation with the customer. This would result in further speech input from the customer. The second representative may be more skilled in the problem area. The two representatives may be at the same location or at different locations. The two representatives may use the same system, or separate systems, to execute the process shown in FIG. 4. A decision to transfer handling to another customer service representative may be based on one or more key words (e.g. a customer name, product name, or problem description), automatically recognized in the customer's speech.

On the other hand, if the problem is resolved at this point, the "Yes" branch is taken at decision 470, and next the function updates one or more databases at block 480. For example, a new key word may be identified and added to a key word database for future use, or information about a problem and its solution may be added to a customer database, or a product database. The function terminates at block 490 (e.g. at the end of a conversation).

Figure 5:
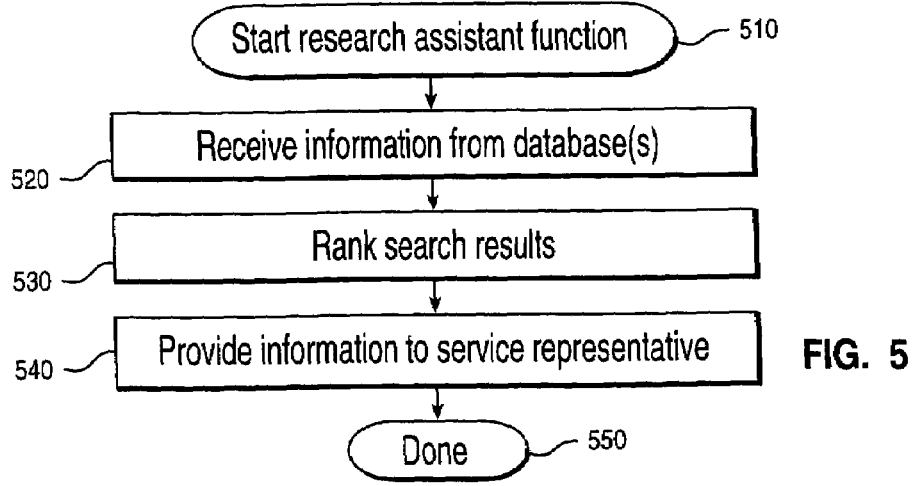
FIG. 5 is a flow chart illustrating an example of a research assistant function.

FIG. 5 is a flow chart illustrating an example of a research assistant function. The function begins at block 510, which may represent the research assistant function being called by another function such as the speech recognition and analysis function illustrated in FIG. 4. At block 520, the function receives search results, i.e. information retrieved from one or more databases. In another example, search and retrieval could be performed by a research assistant function. At block 530, the function ranks the search results, to prepare the information for use by a customer service representative. For example, information predicted to be more useful could be highlighted, listed first, or otherwise presented more prominently than other information. At block 540, the function provides the retrieved information to a customer service representative (e.g. via audio output, or by displaying the information on a screen, or printing information on paper).

The function terminates at block 550 (e.g. at the end of a customer service representative's interaction with a customer).

Figure 6:
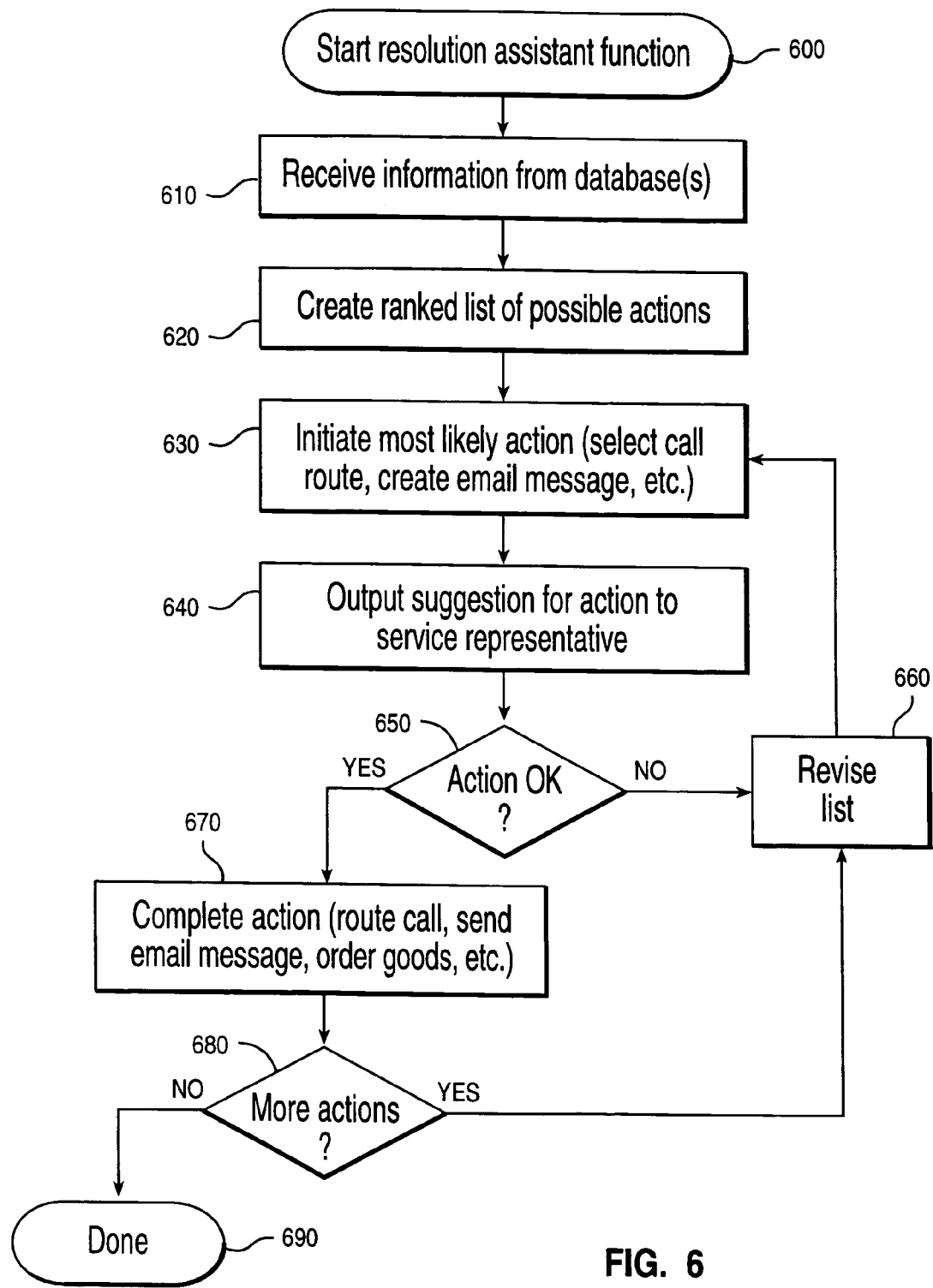
FIG. 6 is a flow chart illustrating an example of a resolution assistant function.

FIG. 6 is a flow chart illustrating an example of a resolution assistant function. The function begins at block 600, which may represent the research assistant function being called by another function such as the speech recognition and analysis function illustrated in FIG. 4. At block 610, the function receives search results, i.e. information retrieved from one or more databases, relating to possible actions to solve a problem. In another example, search and retrieval could be performed by a resolution assistant function. In this example, at block 620, the function ranks the possible actions, according to predicted benefits, cost, or some other criteria. At block 630, the function initiates at least one action to solve a problem affecting the customer. This may involve preparing an e-mail message, preparing an order form, preparing an address label, or routing a telephone call, for example. Next, the function may seek approval for actions before completing them. At block 640, the function outputs suggestions for action to a customer service representative (e.g. via audio output, or by displaying the information on a screen, or printing information on paper). For example, actions predicted to be more useful could be highlighted, listed first, or otherwise presented more prominently than other information. If a customer service representative does not approve a suggested action at decision 650, the "No" branch is taken to block 660. There the list is revised (perhaps the rejected action is deleted or moved to the bottom of the list, for example) before the function returns to block 630. If on the other hand a customer service representative approves a suggested action at decision 650, the "Yes" branch is taken to block 670. There the approved action is completed. This may involve completion of a suggested telephone-call routing to another customer service representative, sending an email message containing an advisory bulletin, or ordering goods such as an updated product, for example. Completion of the action may require further involvement by some person, or completion of the action may be entirely automated. In any event, from the viewpoint of the customer service representative, some or all tasks are delegated or "off-loaded" during a conversation involving a customer.

Next, if more actions remain on the list of possible actions, at decision 680 the "Yes" branch is taken to block 660. There the list of possible actions is revised (the completed action is deleted) before the function returns to block 630. If on the other hand no more actions remain on the list of possible actions, at decision 680 the "No" branch is taken to block 690, where the function terminates (e.g. at the end of a customer service representative's interaction with a customer).

Those skilled in the art will recognize that blocks in the above-mentioned flow charts could be arranged in a somewhat different order, but still describe the invention. Blocks could be added to the above-mentioned flow charts to describe window-managing details, or optional features; some blocks could be subtracted to show a simplified example.

Figure 7:
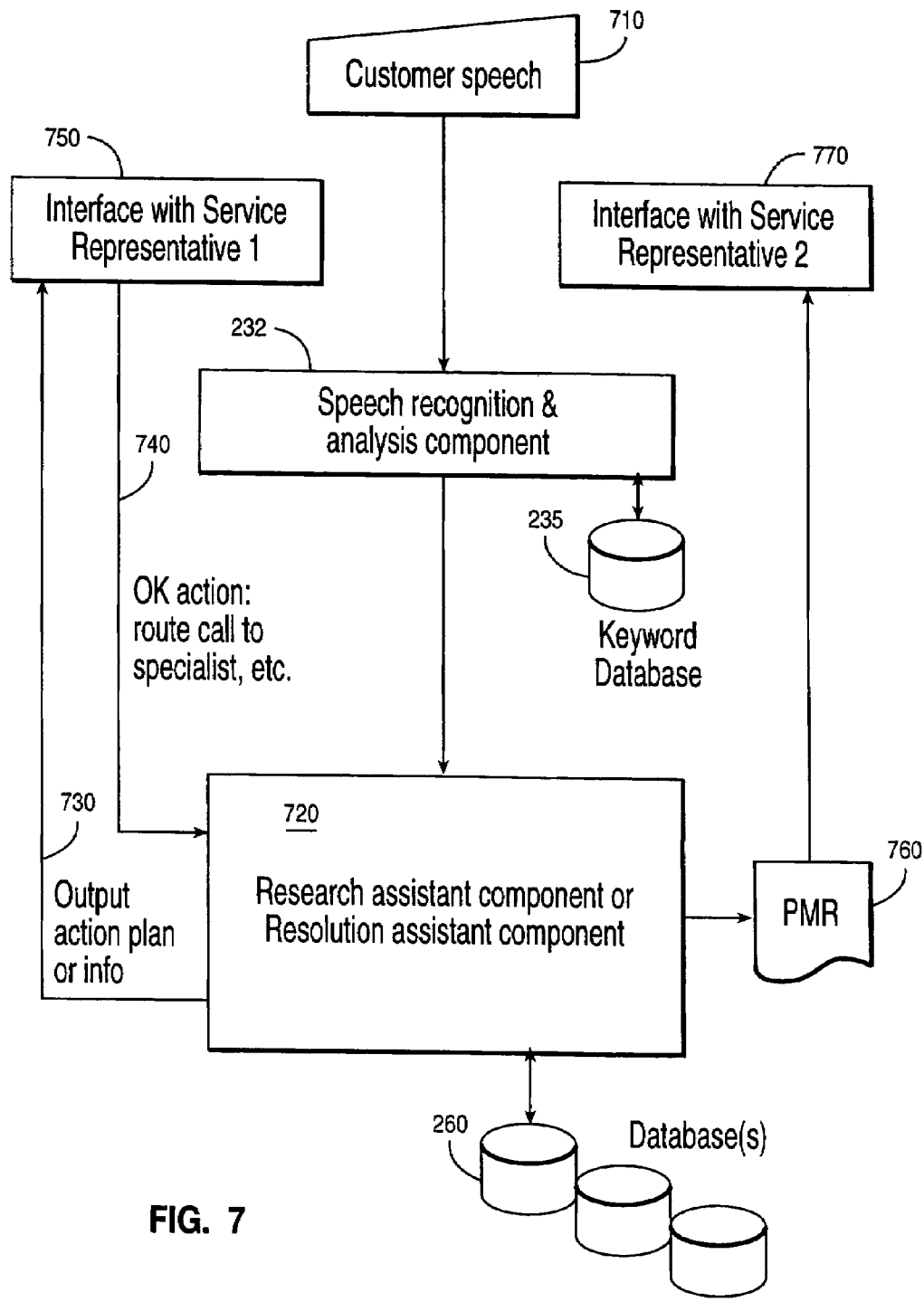
FIG. 7 illustrates selected operations of another exemplary system, employing a research assistant function or a resolution assistant function.

FIG. 7 illustrates selected operations of another exemplary system, employing a research assistant component or a resolution assistant component. This example includes call-routing. Speech recognition and analysis component 232 is shown receiving customer speech input 710, which may be de-cluttered as described above. (Speech recognition and analysis component 232, key word database 235, and one or more databases 260 have been described above.) In this example, speech recognition and analysis component 232 performs speech recognition on said speech input to generate a text equivalent, and parses said text to identify a key word. A research assistant component or a resolution assistant component at 720 searches for an occurrence of said key word in a database 260 and retrieves information from database 260. The retrieving is completed during a conversation involving a customer and a customer service representative.

Either the research assistant component or resolution assistant component at 720 may be implemented by itself. The two may be implemented in the same system as separate components, or as a combination component. They may be implemented with well-known software technologies, including a web server, database management software, and a scripting language such as PHP, Perl, or another similar language, for example. Other technology similar to the above-mentioned examples also may be used.

At arrow 730, a research assistant component or resolution assistant component at 720 provides retrieved information to a first customer service representative through interface 750. Interfaces 750 and 770 may for example represent audio output, or displaying the information on a screen, or printing information on paper. As one example, when a customer speaks the name of a certain product, a research assistant component or resolution assistant component at 720 would access a database pertaining to that product. Next, when a customer describes a problem, a research assistant component at 720 would provide relevant information for diagnosing the problem to a first customer service representative, through interface 750. At the same time, a resolution assistant component at 720 may initiate corrective action, such as ordering a repair package or sending instructions to the customer by email.

The output at arrow 730 may include suggested actions such as routing a customer's telephone call to a second customer service representative who is a specialist, for example. At arrow 740, the first customer service representative may signal approval of suggested actions such as call routing. The customer's call may then be routed to a specialist who would continue the conversation with the customer (resulting in further speech input from the customer), and solve the customer's problem. The second representative may be more skilled in the problem area. The two representatives may be at the same location or at different locations. The two representatives may use the same system, or separate systems. A decision to transfer handling to another customer service representative may be based on one or more key words (e.g. a customer name, product name, or problem description), automatically recognized in the customer's speech. Thus the system in this example initiates action, based on a key word, to solve a problem affecting a customer.

The system in this example creates or updates a problem management record (PMR 760) to document research or actions to solve a problem affecting the customer. Research assistant component or resolution assistant component 720 provides information via PMR 760 to the second customer service representative (the specialist) through interface 770. This may be accomplished by utilizing a communications network (not shown) such as a local area network or the Internet, for example.

In conclusion, examples have been shown of methods and systems employing computerized speech recognition and key words to improve customer service.

One of the preferred implementations of the invention is an application, namely a set of instructions (program code)

in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for handling information used in customer service, said method comprising:
    capturing a customer's speech;
    recognizing a key word in said customer's speech;
    based on said key word, searching a database;
    retrieving information from said database, wherein said retrieving is completed during a conversation involving said customer and a customer service representative; and
    providing said retrieved information to a customer service representative.

2. The method of claim 1, further comprising:
    initiating action, based on said keyword, to solve a problem affecting said customer.

3. The method of claim 1, further comprising at least one of:
    preparing an e-mail message,
    preparing an order form,
    preparing an address label, and
    routing a telephone call.

4. The method of claim 1, wherein said database contains one or more data elements selected from the group consisting of
    customer name elements,
    customer address elements,
    telephone call-routing elements,
    problem management elements,
    product update elements,
    order form elements,
    and advisory bulletin elements.

5. A method for handling information used in customer service, said method comprising:
    receiving speech input from a customer;
    performing speech recognition on said speech input to generate a text equivalent;
    parsing said text to identify a key word;
    searching for an occurrence of said key word in a database;
    retrieving information from said database, wherein said retrieving is completed during a conversation involving said customer and a customer service representative; and
    providing said retrieved information to a customer service representative.

6. The method of claim 5, wherein said speech input is derived from a telephone conversation.

7. The method of claim 5, further comprising:
    initiating action, based on said key word, to solve a problem affecting said customer.

8. The method of claim 7, wherein said initiating action includes performing one or more tasks selected from the group consisting of
    preparing an e-mail message,
    preparing an order form,
    preparing an address label, and
    routing a telephone call.

9. The method of claim 5, wherein said database contains one or more data elements selected form the group consisting of
    customer name elements,
    customer address elements,
    telephone call-routing elements,
    problem management elements,
    product update elements,
    order form elements,
    and advisory bulletin elements.

10. A system for handling information used in customer service, said system comprising:
    means for receiving speech input from a customer;
    means for performing speech recognition on said speech input to generate a text equivalent;
    means for parsing said text to identify a key word;
    means for searching for an occurrence of said key word in a database;
    means for retrieving information from said database, wherein said means for retrieving completes its operation during a conversation involving said customer and a customer service representetive; and
    means for providing said retrieved information to a customer service representative.

11. The system of claim 10, wherein said speech input is derived from a telephone conversation.

12. The system of claim 10, further comprising:
    means for initiating action, based on said key word, to solve a problem affecting said customer.

13. The system of claim 12, wherein said means for initiating action includes means for performing one or more tasks selected from the group consisting of
    preparing an e-mail message,
    preparing an order form,
    preparing an address label, and
    routing a telephone call.

14. The system of claim 13, wherein said database contains one or more data elements selected form the group consisting of
   customer name elements,
   customer address elements,
   telephone call-routing elements,
   problem management elements,
   product update elements,
   order form elements,
   and advisory bulletin elements.

15. A computer-usable medium having computer-executable instructions for handling information used in customer service, said computer-executable instructions comprising:
   means for receiving speech input from a customer;
   means for performing speech recognition on said speech input to generate a text equivalent;
   means for parsing said text to identify a key word;
   means for searching for an occurrence of said key word in a database;
   means for retrieving information from said database, wherein said means for retrieving completes its operation during a conversation involving said customer and a customer service representative; and
   means for providing said retrieved information to a customer service representative.

16. The computer-usable medium of claim 15, wherein said speech input is derived from a telephone conversation.

17. The computer-usable medium of claim 15, further comprising:
   means for initiating action, based on said key word, to solve a problem affecting said customer.

18. The computer-usable medium of claim 17, wherein said means for initiating action includes means for performing one or more tasks selected form the group consisting of
   preparing an e-mail message,
   preparing an order form,
   preparing an address label, and
   routing a telephone call.

19. The computer-usable medium of claim 15, wherein said database contains one or more data elements selected form the group consisting of
   customer name elements,
   customer address elements,
   telephone call-routing elements,
   problem management elements,
   product update elements,
   order form elements,
   and advisory bulletin elements.

20. The method of claim 1, wherein providing said retrieved information to a customer service representative includes:
   identifying a plurality of actions that may be performed to address an issue raised by the customer during the conversation;
   ranking actions within the plurality of actions based on a criteria to thereby generate a ranked list of actions for addressing the issue; and
   outputting the ranked list of actions to the customer service representative.

21. The method of claim 2, further comprising:
   requesting approval of the action from the customer service representative; and
   stopping the action if the customer service representative does not provide approval of the action.

22. The method of claim 20, further comprising:
   initiating an action in the ranked list of actions;
   requesting approval of the action from the customer service representative;
   stopping the action if the customer service representative does not provide approval of the action;
   removing the action from the ranked list of actions in response to stopping the action; and
   revising the ranked list of actions in response to removing the action from the ranked list of actions.

23. The method of claim 20, further comprising:
   performing a plurality of actions in the ranked list of actions in an order determined based on the ranking of actions in the ranked list of actions.

\* \* \* \* \*